and 9 lbs. of charcoal or carbon. In this par-

UNITED STATES PATENT OFFICE 2,377,217

PROCESS FOR SULPHURYL CHLORIDE PRODUCTION

Michael N. Dvornikoff, St. Louis, Mo., and George E. Taylor, Anniston, Ala., assignors to Monsanto Chemical Company, St. Louis, Mo., a corporation of Delaware No Drawing. Application January 2, 1942,
Serial No. 425,426

7 Claims. (Cl. 23—203)

This invention relates to processes for producing sulphuryl chloride from sulphur dioxide and chlorine with the aid of improved catalysts.

It has been known for many years that various forms of charcoal and carbon will catalyze the reaction between sulphur dioxide and chlorine, but the rate of reaction is relatively slow, and the life of the catalyst is short. In the commercial production of sulphuryl chloride by this process, these two factors are of vital importance.

The principal object of our invention is to increase the rate of reaction between sulphur dioxide and chlorine with improved catalysts.

A further object of our invention is to provide an improved catalyst which maintains its activity for long periods of time in the reaction between sulphur dioxide and chlorine for the production of sulphuryl chloride.

We have discovered that the activity and life of carbon catalysts, for the production of sulphuryl chloride from sulphur dioxide and chlorine, can be greatly improved by impregnating the carbon with a metal salt of an inorganic acid. The water-soluble metal salts of inorganic acids are particularly effective for our improved process, that is, those salts which are soluble in water in amounts above about 0.5% at 30° C. In this group of water-soluble salts, the alkali metal and alkaline earth metal salts are preferred. Examples of the water-soluble salts of inorganic acids are sodium chloride, potassium chloride, sodium fluoride, sodium sulphate, zinc chloride, tin chloride, zinc sulphate, sodium sulphate, sodium carbonate, trisodium phosphate, potassium carbonate, aluminum chloride, calcium chloride, sodium nitrate, and the like. Mixtures of these salts of inorganic acids may also be used. The action of these salts or activators when added to carbon is not clearly understood, but it is probable that they inhibit or retard the formation of catalyst poisoners for this reaction, or react with such catalyst poisoners that develop during the reaction. Chlor-sulphonic acid is believed to be one of the catalyst poisoners, and the metal salts of inorganic acids probably react with such catalyst poisoners as soon as they are formed in the reaction mass.

Preparation of catalyst

To illustrate one embodiment of our invention, the improved catalyst may be prepared as follows: to a 25 gallon iron mixer are added 110 lbs. of water, 15 lbs. of a salt such as sodium fluoride and 9 lbs. of charcoal or carbon. In this particular example of our invention, we use a finely divided activated carbon which is known as Darco G-60, manufactured by The Darco Company. This activated carbon is a wood charcoal. The mixture or slurry is agitated while heating for two hours at about its boiling point. This type of mixing gives the salt (sodium fluoride) sufficient time to impregnate the small particles of carbon. The mixture is then cooled to about room temperature and the solution or slurry is filtered. The filtrate, consisting of a water solution of the salt, is recycled to the iron mixer for use in making up the next batch of catalyst. The filter cake is then thoroughly dried by any conventional means, for example, by heating at 175–200° C. for 2–3 hours. If desired, vacuum may be applied to hasten drying. The dry catalyst is light and powdery.

The filter cake obtained in the above manner will consist of carbon impregnated with a solution of the salt used. In some cases, a part of the salt will crystallize from the solution when cooled to about room temperature and accordingly will be suspended in the catalyst slurry. When the slurry is filtered, these salt crystals will be mechanically mixed with the treated carbon, but the presence of the salt mechanically mixed in this form does not impair the effectiveness of the catalyst. In the case of sodium fluoride, for example, a saturated solution at 30° C. contains about 4% of sodium fluoride. In the above example, where the ratio of water, carbon and sodium fluoride was about 60:8:5, respectively, about 4.5 lbs. of sodium fluoride remained with the 9 lbs. of carbon particles, a portion of this sodium fluoride was mechanically mixed with the carbon particles, and the remainder was in the water solution that impregnated the carbon particles. Our improved catalyst may be prepared by mixing, with or without heating, a slurry or solution of the salt with the carbon particles and then filtering and drying. For example, our improved catalyst has been prepared by boiling a 4% sodium fluoride solution and carbon for a period of 1–2 hours and then cooling, filtering and drying as described above.

The dry catalyst, that is, the dried filter cake, will consist of the carbon or charcoal impregnated with the salt used, and substantially all of the salt may be distributed throughout the carbon particles, or it may consist of a dry mechanical mixture of the salt and carbon with some of the salt distributed throughout the carbon particles. In general, the amount of salt present in and mixed with the dry catalyst may vary from about 2-60% by weight, but we prefer to use catalysts containing from about 30-50% by weight of the salt. In the above example, where 110 parts of water, 15 parts of sodium fluoride and 9 lbs. of Darco G-60 activated carbon were used, the dried catalyst contained 50% of sodium fluoride—a portion being mechanically mixed with the carbon, and the rest impregnated into the body of the carbon particles.

In the foregoing description and in the description to follow we have used the term "salt" in its generic sense to include the metal salts of inorganic acids. When sodium chloride is referred to, it will be so described.

In case a water-insoluble salt is to be used, it may be precipitated in the carbon. For example, if zinc phosphate is to be used, the carbon is first saturated with a solution of zinc chloride, filtered, and then placed into a solution of sodium phosphate. The sodium phosphate wil react with the zinc chloride and form zinc phosphate throughout the porous structure of the carbon. The thus treated carbon is filtered and dried as described hereinbefore.

In preparing the catalyst for use in our invention, carbons of any origin such as those of vegetable, mineral or animal origin, may be used. Any of these carbons, without being treated with a metal salt of an inorganic acid, will catalyze the reaction between sulphur dioxide and chlorine, but if these carbons are treated with a metal salt of an inorganic acid, as indicated hereinbefore, the life and activity of the carbon wil be substantially improved. I prefer to use carbon of vegetable origin. The carbons of vegetable origin may be derived from carbonized wood, coconut shells, residues from waste black liquors of paper mills, and the like. The principal source of the mineral carbons is from carbonized lignin.

*Preparation of sulphuryl chloride*

To a 50 gallon stainless steel reaction vessel containing 10 lbs. of my improved catalyst (sodium fluoride-carbon mixture), liquid chlorine and liquid sulphur dioxide are added in substantially equimolar proportions at a rate that does not exceed the capacity of the catalyst to bring about the reaction of the sulphur dioxide and chlorine about as rapidly as they are added to the reaction zone. If the sulphur dioxide and chlorine are added too rapidly pressure tends to build up in the reaction vessel. In this specific case, using the sodium fluoride-carbon catalyst, we added the liquid sulphur dioxide and liquid chlorine, while stirring, at the rate of approximately 64 lbs. of sulphur dioxide and 71 lbs. of chlorine per hour, for a period of about 4 hours. At the end of the 4-5 hours, depending upon the rate at which the sulphur dioxide and liquid chlorine are charged to the reactor, a small sample of the reaction product is analyzed to determine whether there is present any unreacted chlorine or sulphur dioxide. In the event that unreacted chlorine is present, sufficient sulphur dioxide should be added to react with it, but if unreacted sulphur dioxide is present, sufficient chlorine should be added to react with it. After the correct amount of chlorine or sulphur dioxide has ben added, stirring for about fifteen (15) minutes is recommended.

The reaction vessel is closed, provided with a stirrer, an off gas line leading to a pressure gauge and vent, and cooling coils. The reaction may be conducted at atmospheric pressure as well as elevated pressures. We have found that the pressure can be easily maintained at about 1-5 lbs. per square inch, but, if desired, pressures up to 25 lbs. and higher may be used. When the chlorine and sulphur dioxide are first charged to the reactor, the air in the reactor should be vented to prevent the pressure from building up during the reaction.

The reaction between sulphur dioxide and chlorine is exothermic, and cooling coils should be provided in the reactor to maintain the temperature of the reaction mass below about 55° C. The heat of formation of sulphuryl chloride is about 150 B. t. u. per lb., and sufficient tap water or cold brine should be circulated through the cooling coils in the reactor to maintain the temperature of the reaction mass below about 55° C. Higher temperatures may be used without interfering with the process, but since elevated pressures will be needed to maintain the reactants in the liquid phase, we prefer as a practical matter to carry out the liquid phase reaction and operate at temperatures below 55° C. and preferably within the range of 30-40° C.

After the reaction is complete, the stirring is stopped and the reaction mass is permitted to settle for 1-2 hours. The catalyst settles to the bottom of the reactor, and the supernatant liquid, sulphuryl chloride, is withdrawn and filtered to remove any suspended matter. The filtered sulphuryl chloride is then passed to storage. If desired, the sulphuryl chloride may be distilled, but as a rule this is not necessary. The yield of sulphuryl chloride obtained by my process is substantially 100%.

The suspension of catalyst and sulphuryl chloride remaining in the reactor or settler may be reused for the next batch. In fact, this "heel" may be reused until its activity falls below practical limits. If desired, small amounts of fresh catalyst may be added to this "heel."

The data set forth in the table below illustrate the improvements obtained by our process. The column headed "catalyst" describes the composition of the catalyst used as well as the amount used in the test. The carbon used to prepare the catalyst referred to in the table was activated Darco G-60. The column entitled "average rate lbs./hr./lb. catalyst" shows the amount of sulphuryl chloride produced per hour per lb. of catalyst in the reactor. The other headings are self-explanatory.

| Example | Catalyst | Average rate, lbs./hr./lb. catalyst | Life of the catalyst in hours | Yields in per cent based on Cl₂ |
|---|---|---|---|---|
| 1 | Untreated carbon—(Darco G-60) 0.65 lb. | 2.2 | 3.0 | 93 |
| 2 | Carbon treated with NaF solution, 50% NaF in dry catalyst—0.88 lb. | 12.5 | >10 | 98 |
| 3 | Same as 2—1.76 lbs. | 13.5 | >10 | 95.5 |
| 4 | Same as 2—0.44 lb. | 16.5 | 25 | 96 |
| 5 | Carbon treated with 4% NaF solution—0.44 lb. | 20.0 | 10 | 99.5 |
| 6 | Same as 5—0.60 lb. | 23.5 | >10 | 99.5 |

A large variety of commercial types of charcoal, carbon and activated carbons have been tried as a catalyst for the liquid phase reaction $$SO_2 + Cl_2 = SO_2Cl_2$$

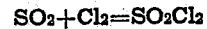

and it was found that Darco G-60 gave the best results. However, as shown by Example 1 above, this type of activated carbon had a life of only 3 hours, and the rate of reaction gave only 2.2 lbs.

of sulphuryl chloride per hour per lb. of carbon catalyst. By treating this carbon with an aqueous solution of sodium fluoride (as described hereinbefore under the heading "Preparation of catalyst") it was found that the treated carbon greatly accelerated the rate of reaction, as shown by Example 2 of the table, to the extent of producing 12.5 lbs. of sulphuryl chloride per hour per lb. of catalyst present in the reactor. Likewise, the life of the catalyst was greater than 10 hours. No attempt was made in this particular test to determine the full line of the catalyst. Test No. 3 was exactly like test No. 2, except that twice the amount of catalyst was used, and it was found that the reaction rate was substantially the same and that the life of the catalyst was more than 10 hours. Again, in this test, no attempt was made to determine the full life of the catalyst. Test No. 4 was exactly like test No. 2 except that half the amount of catalyst was used, and it was found that the reaction rate was somewhat higher, and that the catalyst lasted for 25 hours before there was a decrease in its activity. In test No. 5, the catalyst was prepared by boiling the carbon (Darco G-60) with a 4% aqueous solution of sodium fluoride, in the manner described hereinbefore, so that practically all of the sodium fluoride would be impregnated into the carbon particles. It will be observed that the rate of reaction was many times faster than that obtained by activated carbon not treated in accordance with our invention, and that the catalyst lasted for 10 hours before showing a decrease in activity.

While our improved catalysts have been described above with reference to a liquid phase reaction, they may also be used to accelerate the vapor phase reaction between sulphur dioxide and chlorine. As a practical matter, the liquid phase reaction proved easier to conduct, and in view of the high rate of activity of our catalysts, we prefer to effect the reaction between sulphur dioxide and chlorine in the liquid phase. The vapor phase reaction may be carried out by passing gaseous chlorine and sulphur dioxide over our improved catalyst and then condensing the effluent from the catalyst zone to precipitate out liquid sulphuryl chloride. The unreacted gaseous chlorine and sulphur dioxide, which separate from the condensed liquid sulphuryl chloride, are recovered and recycled to the reaction zone and used as a part of the charge to the catalyst zone.

The vapor phase reaction is carried out at temperatures above the boiling point of sulphuryl chloride to avoid condensation of the sulphuryl chloride upon the catalyst surface, and in general the vapor phase reaction is preferably conducted in the neighborhood of 100° C. Temperatures within the range of 95-125° are convenient for the vapor phase reaction.

Inasmuch as the above specification comprises illustrative embodiments of our invention, it is to be understood that the invention is not limited thereto except by the appended claims.

I claim:

1. In the process of preparing sulphuryl chloride, the steps comprising reacting sulphur dioxide and chlorine in the presence of a catalyst comprising carbon, impregnated with a metal salt of an inorganic acid.

2. In the process of preparing sulphuryl chloride, the steps comprising reacting sulphur dioxide and chlorine in the presence of carbon particles impregnated with the metal salt of an inorganic acid.

3. In the process of preparing sulphuryl chloride, the steps comprising reacting sulphur dioxide and chlorine in the presence of a catalyst comprising carbon impregnated with a water-soluble salt of an inorganic acid.

4. In the process of preparing sulphuryl chloride, the steps comprising reacting sulphur dioxide and chlorine in the presence of a catalyst comprising carbon particles impregnated with an alkali metal salt of an inorganic acid.

5. In the process of preparing sulphuryl chloride, the steps comprising reacting sulphur dioxide and chlorine in the presence of a catalyst, comprising finely divided carbon impregnated with a water-soluble alkaline earth metal salt of an inorganic acid.

6. In the process of preparing sulphuryl chloride, the steps comprising reacting liquid sulphur dioxide and liquid chlorine in the presence of finely divided carbon impregnated with a water-soluble metal salt of an inorganic acid.

7. In the process of preparing sulphuryl chloride, the steps comprising reacting liquid sulphur dioxide and liquid chlorine at a temperature within the range of 20-55° C. in the presence of finely divided carbon impregnated with sodium fluoride.

MICHAEL N. DVORNIKOFF.
GEO. E. TAYLOR.